United States Patent [19]
Valimaa et al.

[11] Patent Number: 5,926,769
[45] Date of Patent: Jul. 20, 1999

[54] CELLULAR TELEPHONE HAVING SIMPLIFIED USER INTERFACE FOR STORING AND RETRIEVING TELEPHONE NUMBERS

[75] Inventors: Veli-Matti Valimaa, Salo, Finland; Henrik Lindberg, Warszawa, Poland

[73] Assignee: Nokia Mobile Phones Limited, Salo, Finland

[21] Appl. No.: 08/801,773

[22] Filed: Feb. 18, 1997

[51] Int. Cl.$^6$ ........................................................ H04Q 7/32
[52] U.S. Cl. ................................................ 455/564; 379/355
[58] Field of Search ................................... 455/564–566; 379/354, 355, 356, 914

[56] References Cited

U.S. PATENT DOCUMENTS

| | | | |
|---|---|---|---|
| 4,511,764 | 4/1985 | Nakayama et al. | 179/90 AN |
| 5,247,565 | 9/1993 | Joglekar | 379/355 X |
| 5,247,572 | 9/1993 | Koma | 379/356 |
| 5,266,949 | 11/1993 | Rossi | 341/22 |
| 5,267,308 | 11/1993 | Jokinen et al. | 379/354 |
| 5,305,372 | 4/1994 | Tomiyori | 455/564 |
| 5,408,060 | 4/1995 | Muurinen | 200/314 |
| 5,491,745 | 2/1996 | Roeder | 379/355 |
| 5,594,778 | 1/1997 | Schaupp, Jr. et al. | 455/564 X |
| 5,675,630 | 10/1997 | Beatty | 455/564 X |
| 5,754,602 | 5/1998 | Landry et al. | 379/355 |

FOREIGN PATENT DOCUMENTS

| | | |
|---|---|---|
| 0 540 928 A3 | 5/1993 | European Pat. Off. . |
| 07 240 780 | 9/1995 | Japan . |

OTHER PUBLICATIONS

Sony CM-H333 "Portable Cellular Telephone with Accessories Operating Instructions", pp. 12–13, 24–25, 1993.

*Primary Examiner*—Dwayne D. Bost
*Assistant Examiner*—William G. Trost
*Attorney, Agent, or Firm*—Perman & Green, LLP

[57] ABSTRACT

In a first embodiment a method includes the steps of (a) entering n numeric characters from a keypad; (b) detecting the entry of the $n^{th}$ numeric character; and (c) storing n–1 of the entered characters in a multi-location telephone number memory at a location specified by the $n^{th}$ numeric character. In one embodiment the step of detecting includes a step of detecting that a keypad key used to enter the $n^{th}$ numeric character is depressed for an amount of time that exceeds a predetermined duration, while in another embodiment the step of detecting includes a step of detecting that a keypad key used to enter the $n^{th}$ numeric character is depressed a plurality of times within a period that is less than a predetermined duration. In a further embodiment the step (c) stores a first n–m of the entered characters in a multi-location telephone number memory, where m is equal to or greater than one, at a location specified by the $m^{th}$ character or characters. In a still further embodiment the step (c) stores a first n–m of the entered characters in a specified location of a specified one of a plurality of multi-location telephone number memories, wherein m is greater than one, and wherein both the location and the multi-location telephone number memory are specified by the $m^{th}$ characters.

18 Claims, 3 Drawing Sheets

5,926,769

CELLULAR TELEPHONE HAVING SIMPLIFIED USER INTERFACE FOR STORING AND RETRIEVING TELEPHONE NUMBERS

FIELD OF THE INVENTION

This invention relates generally to wireless telephones and personal communicators and, in particular, to user interfaces for such devices.

BACKGROUND OF THE INVENTION

Modern cellular telephones normally contain a memory wherein a user can store some number of predetermined telephone numbers, typically numbers that are often called by the user. In order to store numbers in the telephone number memory it is typically the case that some type of hierarchical menu function is implemented to enable the user to select a telephone number memory function, and to then selectively read and store numbers in the memory. Certain predetermined keypad keys can be provided for implementing this function, such as menu and so-called soft keys.

While this technique is well suited for performing these functions, it can be appreciated that in some cases it may be desirable to simplify the telephone's user interface so as to eliminate or reduce the requirement for menu functions and predetermined keys. This would not only provide a conceptually simple user interface, but may also beneficially reduce the cost and complexity of the cellular telephone, personal communicator, or any wireless communicator, such as a data organizer and/or personal digital assistant, the stores telephone numbers that are called by a user.

OBJECTS AND ADVANTAGES OF THE INVENTION

It is a first object and advantage of this invention to provide an improved user interface for a wireless communicator.

It is a further object and advantage of this invention to provide a telephone number storage system for a wireless communicator that enables a telephone number to be entered into a telephone number memory with but one additional keystroke than that required to enter the telephone number itself.

SUMMARY OF THE INVENTION

The foregoing and other problems are overcome and the objects and advantages of the invention are realized by methods and apparatus in accordance with embodiments of this invention, wherein a method is disclosed for operating a wireless communicator to store a telephone number into a memory of the wireless communicator.

In a first embodiment the method includes the steps of (a) entering n numeric characters from a keypad; (b) detecting the entry of the $n^{th}$ numeric character; and (c) storing n−1 of the entered characters in a multi-location telephone number memory at a location specified by the $n^{th}$ numeric character. In one embodiment the step of detecting includes a step of detesting that a keypad key used to enter the $n^{th}$ numeric character is depressed for an amount of time that exceeds a predetermined duration, while in another embodiment the step of detecting includes a step of detecting that a keypad key used to enter the $n^{th}$ numeric character is depressed a plurality of times within a period of time that is less than a predetermined duration.

Further in accordance with this invention the step of storing includes preliminary steps of (d) reading the specified location; and (e) determining if the specified location is empty. If the specified location is determined to be empty, the method then stores the n−1 of the entered characters in the specified location. Else, if the specified location is determined not to be empty, the method prompts a user as to whether to store the n−1 of the entered characters in the specified location, and stores the n−1 of the entered characters in the specified location only if an affirmative response is received from the user.

In a further embodiment of a method the step (c) stores a first n−m of the entered characters in a multi-location telephone number memory, where m is equal to or greater than one, at a location specified by the $m^{th}$ character or characters.

In a still further embodiment of a method the step (c) stores a first n−m of the entered characters in a specified location of a specified one of a plurality of multi-location telephone number memories, wherein m is greater than one, and wherein both the location and the multi-location telephone number memory are specified by the $m^{th}$ characters.

Also disclosed is technique for reading out and displaying a telephone number from a specified location in one or a plurality of telephone number memories, as well as a mobile station that is constructed to operate in accordance with the presently preferred methods.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
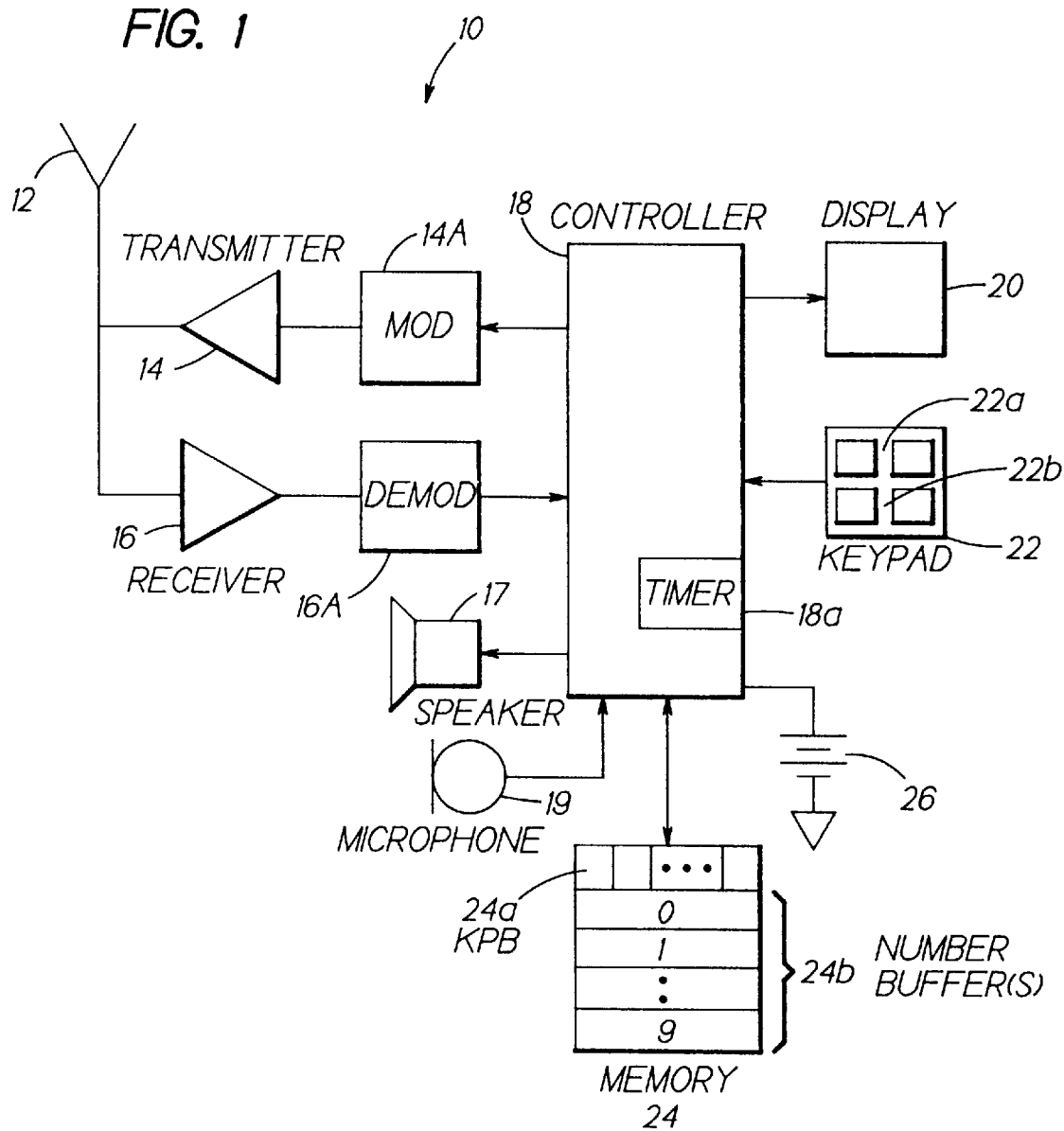
FIG. 1 is a block diagram of a mobile station that is constructed and operated in accordance with this invention.
Figure 2:
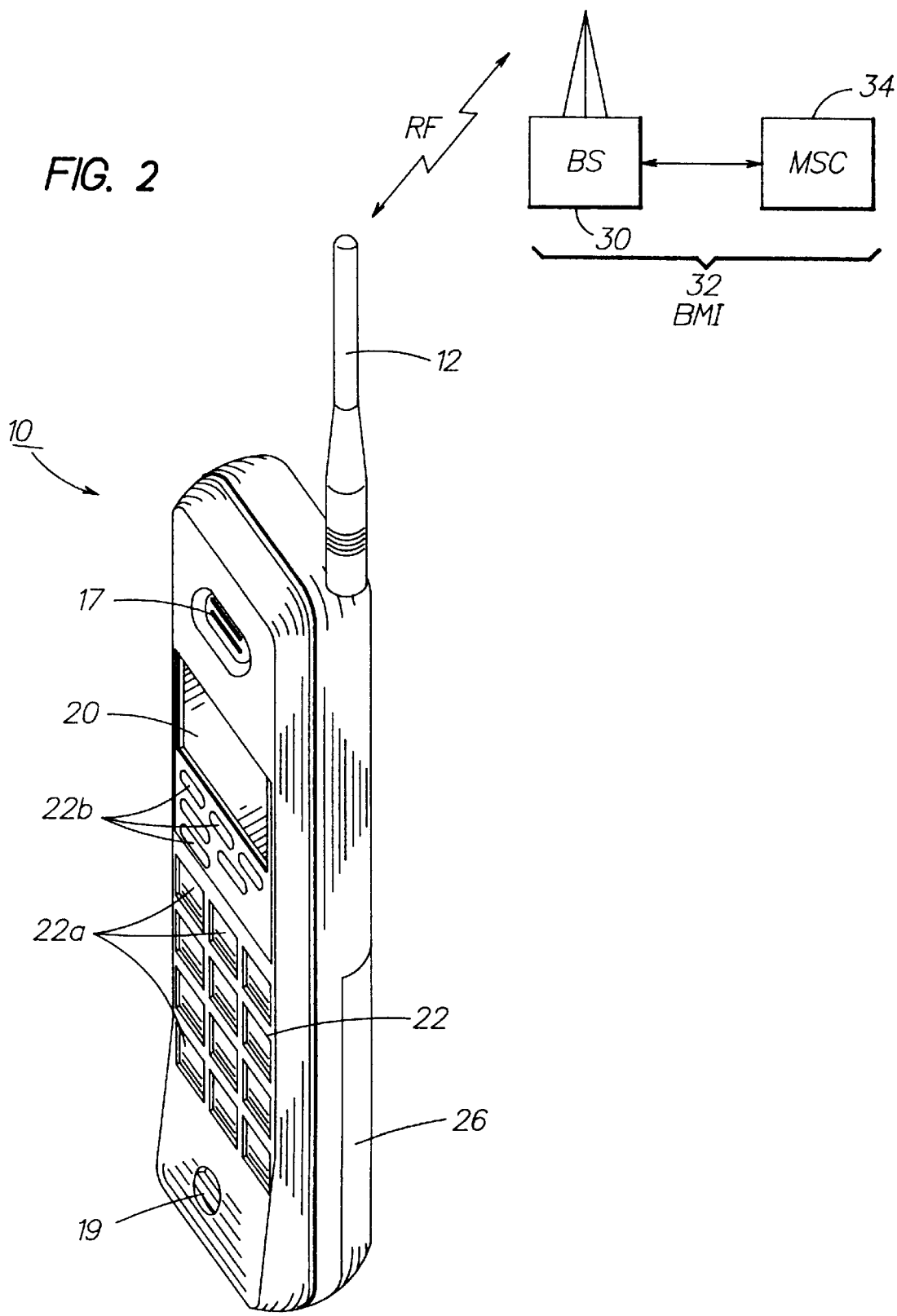
FIG. 2 is an elevational view of the mobile station shown in FIG. 1, and which further illustrates a cellular communication system to which the mobile station is bidirectionally coupled through wireless RF links.

Before describing this invention in further detail, reference is first made to FIGS. 1 and 2 for illustrating a wireless communicator, user terminal, or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys (if provided), and a clear (CLR) key that is used to clear the display, any entered characters, and to place the mobile station in a known state. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of air interface standards, such as AMPS, IS-136, GSM and IS-95. Narrow-band AMPS (NAMPS), as well as TACS, mobile stations may also benefit from the teaching of this invention, as should dual or higher mode phones. It should thus be clear that the teaching of this invention is not to be construed to be limited to any one particular type of mobile station or air interface standard.

The operating program in the memory 24 includes routines to present messages and message-related functions to the user on the display 20. The memory 24 also includes routines for implementing the method described below in relation to FIG. 3.

The memory 24 is assumed for the purposes of this invention to include a multi-location keypad buffer (KPB) 24a that is used for temporarily storing codes that identify keypad keys that are depressed by the user. By example, the controller 18 detects the depression of a certain key 22a, and then stores a corresponding code in a next available location of the KPB 24a. The number of locations reserved for the KPB 24a is any reasonable number that is at least sufficient to store a longest possible telephone number that may be entered by the user.

The memory 24 is also assumed to include at least one multi-location telephone number buffer (NUM$_{13}$ BUF) 24b. The NUM$_{13}$ BUF 24b is used to store a plurality of telephone numbers that are entered by the user, typically numbers that the user often calls. By example, the NUM$_{13}$ BUF 24b may have 10 locations or addresses, each one having a sufficient number of memory locations to store a longest possible telephone number. Preferably the NUM$_{13}$ BUF 24b is located in a non-volatile read/write portion of the memory 24. The management of the NUM$_{13}$ BUF 24b forms the subject matter of this invention.

Figure 3:
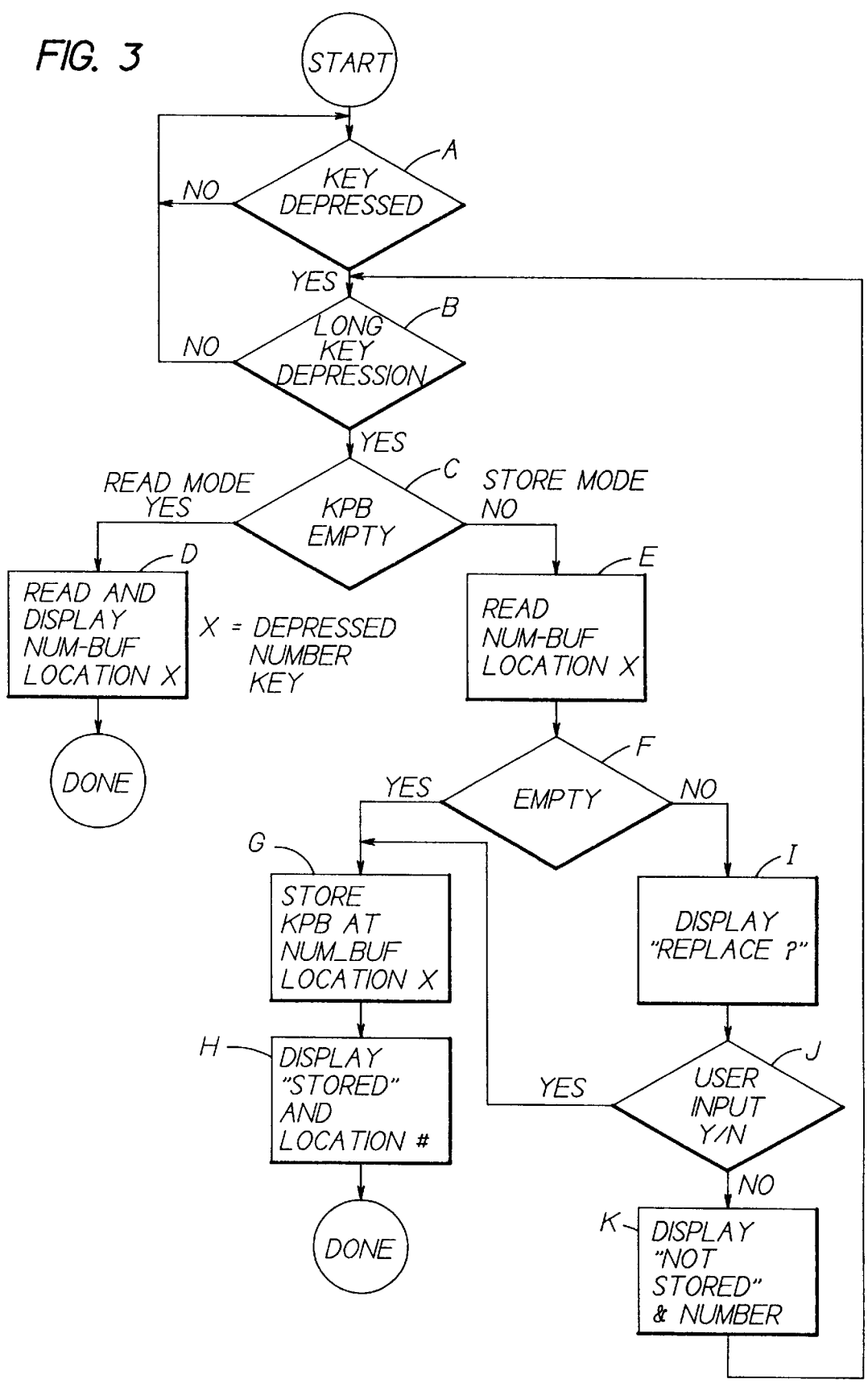
FIG. 3 is logic flow diagram of one presently preferred embodiment of this invention.

Reference is now made to FIG. 3 for illustrating a presently preferred method for operating and managing the NUM$_{13}$ BUF 24b.

At Block A the controller 18 monitors the keypad 22 to detect the depression of a key 22A or 22B. If a key is not depressed the controller 18 loops back through Block A. In other embodiments of the invention the keypad/controller interface can be interrupt driven such that the controller 18 only enters the Block A upon the depression of a key by the user.

Assuming that a key is depressed, control passes to Block B where the controller 18 determines whether the key depression was a "normal" depression, such as one lasting less than 1.5 seconds, or a "long" key depression, such as one lasting greater than 1.5 seconds. An internal controller timer 18a can be used for measuring the duration of the key depression. For the case where a normal keypad depression is made the controller 18 stores a code in the next available location of the KPB 24a, the stored code indicating the identity of the depressed key. For the case where a long key depression is detected, control passes to Block C where the controller 18 determines if the KPB 24a is empty. If Yes, it is assumed that a Read Mode is requested by the user, and that the user may have previously depressed the CLR key to clear the display 20 and the KPB 24a. If No at Block C, it is assumed that a Store Mode is requested by the user.

Describing the Read Mode first, at Block D the controller 18 reads a NUM$_{13}$ BUF 24b location X, where X is equal to the depressed numeric key. For example, if the user makes a long depression of the key number 5, the location 5 of NUM$_{13}$ BUF 24b is read by the controller 18 and then displayed on the display 20. In the read mode the user is thus enabled to examine selected ones of the NUM-BUF 24b locations. After having recalled a specified one of the telephone numbers, the user may also be able to place a call to the number simply by depressing the SEND key.

Returning to Block C, if the KPB 24a is not empty, it can be assumed theft the user has previously entered a plurality of numbers corresponding to a telephone number to be stored in the NUM$_{13}$ BUF 24b. In this case control passes to Block E where the controller 18 reads the corresponding NUM$_{13}$ BUF location X, where X is again the number associated with the long key depression. At Block F the controller 18 determines whether the specified NUM$_{13}$ BUF location is empty (i.e., available for use). This can be indicated by storing predetermined codes in the NUM$_{13}$ BUF location, such as nulls, or by the use of a binary flag for each location that indicates whether the location contains valid data. That is, a particular NUM$_{13}$ BUF location may contain data, but can still be considered to be empty or available for use if the associated flag so indicates.

If Yes at Block F (i.e., the specified NUM$_{13}$ BUF 24b location is empty), control passes to Block G where the controller 18 stores the contents of the KPB 24a at NUM$_{13}$ BUF location X. Control then passes to an optional step H where the controller 18 displays a messages such as "stored" or "number saved", and also the location number in the NUM$_{13}$ BUF 24b. The method then terminates, as the controller has stored the telephone number entered by the user at the desired location.

Returning to Block F, and assuming that the controller 18 has found that: the specified location (e.g., 0–9) is not empty, control passes to Block I where the controller 18 displays a suitable message such as "location in use". The controller may also display the number that is stored in the specified location with a prompt such as "replace?" Control then passes to Block J where the controller 18 waits for a keypad input from the user. If the user responds affirmatively to the "replace?" prompt, control passes to Block G to store the contents of the KPB 24a at the specified location in the $NUM_{13}$ BUF 24b, thereby overwriting the previously stored telephone number. If instead the user's response is negative at Block J, control passes to Block K where the controller 18 displays a suitable message such as "not stored" and the telephone number entered by the user (i.e., the contents of the KPB 24A). At this time control may pass back to Block B to accept another long key depression from the user for specifying another location in the $NUM_{13}$ BUF 24b. Alternatively, the controller 18 may simply enter another loop (not shown) to await a numeric key input from user (short or long depression) for specifying another $NUM_{13}$ BUF location.

It can be appreciated that the above-described method provides an efficient and simplified user interface for storing and retrieving telephone numbers in the mobile station 10. This method avoids the use of specific menu and sub-menu functions to store and retrieve telephone numbers.

By example, the user may enter the sequence 555 1212 $\underline{8}$, where $\underline{8}$ is a long key depression. This key sequence is interpreted by the controller 18 as a command to store the telephone number 555-1212 into $NUM_{13}$ BUF location number 8. If the user instead first depresses the CLR key to clear the display and the KPB 24a, and then enters $\underline{8}$, the controller instead reads $NUM_{13}$ BUF location 8, and displays the contents (if any) to the user. If the location is empty, a suitable message can be displayed, such as "location is empty".

It is also within the scope of this invention to define a plurality of $NUM_{13}$ BUFs 24b, and to distinguish between them by a combination of the long key depression and a preceding key depression. By example, and for a case where two $NUM_{13}$ BUFs 24b are defined (i.e., $NUM_{13}$ $BUF_1$ and $NUM_{13}$ $BUF_2$), the user may enter the sequence 555 1212 #$\underline{8}$, where $\underline{8}$ is the long key depression. This key sequence is interpreted by the controller 18 as a command to store the telephone number 555-1212 into $NUM_{13}$ $BUF_2$ location number 8. In this case the controller 18 examines the preceding key code in the KPB 24a to determine if it is a numeric key (0–9) or the key #. If the preceding key code is a numeric key, then it is assumed to be a part of the telephone number, which is then stored in $NUM_{13}$ $BUF_1$. If the preceding key code is instead the non-numeric key #, then it is assumed to not be a part of the telephone number, which is then stored in $NUM_{13}$ $BUF_2$. Three of the $NUM_{13}$ BUFs 24b can be defined in this manner by also using the key *, in conjunction with the key #.

Alternatively, the method may be practiced by defining two or more numeric keystrokes for specifying an identity of a particular $NUM_{13}$ BUF and the location in the $NUM_{13}$ BUF. By example, 10 different 10 location $NUM_{13}$ BUFs can be identified by defining that the last two keystrokes are $NUM_{13}$ BUF-related, with the last keystroke being a long keystroke. For example, the user may enter the sequence 555 1212 3$\underline{8}$, where $\underline{8}$ is the long key depression. This key sequence is interpreted by the controller 18 as a command to store the telephone number 555-1212 into $NUM_{13}$ BUF number 3, location number 8. Further by example the sequence 555 1212 0$\underline{0}$, where $\underline{0}$ is the long key depression, is interpreted by the controller 18 as a command to store the telephone number 555-1212 into $NUM_{13}$ BUF number 0, location number 0.

Other combinations and permutations of the foregoing can be employed to define different numbers of $NUM_{13}$ BUFs and $NUM_{13}$ BUF locations. By example, three $NUM_{13}$ BUF related keystrokes (e.g., 555 1212 xy$\underline{z}$) could be used to define up to 10 different $NUM_{13}$ BUFs (x), each having up to 100 locations (y$\underline{z}$), or up to 100 $NUM_{13}$ BUFs (xy) each having up to 10 location, ($\underline{z}$). The ordering of the characters could be reversed if desired, for example, three $NUM_{13}$ BUF related keystrokes (e.g., 555 1212 xy$\underline{z}$) could be used to define up to 100 different locations (xy) in up to 10 different $NUM_{13}$ BUFs ($\underline{z}$). In a practical sense the numbers of $NUM_{13}$ BUFs 24b and the number of locations in each is constrained only by the available amount of memory in the mobile station 10.

Although described in the context of using a long key depression (e.g., a key depression equal to or exceeding 1.5 seconds) to indicate that a $NUM_{13}$ BUF operation is requested, it is within the scope of this invention to instead use, by example, two rapidly repeated key depressions (e.g., two depressions of the same key within one second). Whatever technique is selected, preferably it is one that is efficient to implement, and that provides the user with a simple user interface.

While the invention has been described in the context of the user entering the telephone number as a sequence of numbers from the set (0–9), it should be realized that in some embodiments non-numeric characters may be interspersed with the numeric characters (e.g., parentheses and/or a hyphen, e.g., 1-(999)555-1212). In this case the controller 18 can simply ignore the non-numeric characters, either by stripping then away before storing the number in the $NUM_{13}$ BUF 24a, or may store them but later ignore them when placing a call to the number.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless communicator to store a telephone nuumber into a memory of the wireless communicator, comprising the steps of:

entering n consecutive numeric characters from a keypad without entering a non-numeric character;

measuring a duration of at least one keypress for designating the entry of the $n^{th}$ numeric character; and storing the first n–1 of the entered characters in a multi-location telephone number memory at a location specified by the $n^{th}$ numeric character.

2. A method as set forth in claim 1, wherein the step of measuring includes a step of detecting that a keypad key used to enter the $n^{th}$ numeric character is depressed for an amount of time that exceeds a predetermined duration.

3. A method as set forth in claim 1, wherein the step of measuring includes a step of detecting that a keypad key used to enter the $n^{th}$ numeric character is depressed a plurality of times within a period that is less than a predetermined duration.

4. A method as set forth in claim 1, wherein the step of storing includes preliminary steps of:

reading the specified location; and determining if the specified location is empty;

if the specified location is determined to be empty, then storing the first n–1 of the entered characters in the specified location; else, if the specified location is determined not to be empty, prompting a user as to whether to store the first n−1 of the entered characters in the specified location, and storing the first n−1 of the entered characters in the specified location only if an affirmative response is received from the user.

5. A method for operating a wireless communicator to store a telephone number into a memory of the wireless communicator, comprising the steps of:

entering n consecutive characters from a keypad using characters selected from a set of keys consisting of numeric keys 0, 1, 2, 3, 4, 5, 6, 7, 8 and 9;

measuring a duration of at least one keypress for designating the entry of the $n^{th}$ character; and storing a first n−m of the entered characters in a multi-location telephone number memory, where m is equal to or greater than one, at a location specified by the $m^{th}$ character or characters.

6. A method as set forth in claim 5, wherein the step of measuring includes a step of detecting that a keypad key used to enter the $n^{th}$ character is depressed for an amount of time that exceeds a predetermined duration.

7. A method as set forth in claim 5, wherein the step of measuring includes a step of detecting that a keypad key used to enter the $n^{th}$ character is depressed a plurality or times within a period that is less than a predetermined duration.

8. A method as set forth in claim 5, wherein the step of storing includes preliminary steps of:

reading the specified location; and determining if the specified location is empty;

if the specified location is determined to be empty, then storing the first n−m of the entered characters in the specified location; else, if the specified location is determined not to be empty, prompting a user as to whether to store the first n−m of the entered characters in the specified location, and storing the first n−m of the entered characters in the specified location only if an affirmative response is received from the user.

9. A method for operating a wireless communicator to store a telephone number into a memory of the wireless communicator, comprising the steps of:

entering n consecutive characters from a keypad using characters selected from a set of keys consisting of numeric keys 0, 1, 2, 3, 4, 5, 6, 7, 8 and 9;

measuring a duration of at least one keypress for designating the entry of the $n^{th}$ character; and storing a first n−m of the entered characters in a specified location of a specified one of a plurality of multi-location telephone number memories, wherein m is greater than one, and wherein both the location and the multi-location telephone number memory are specified by the last entered $m^{th}$ characters.

10. A method as set forth in claim 9, wherein the step of measuring includes a step of detecting that a keypad key used to enter the $n^{th}$ character is depressed for an amount of time that exceeds a predetermined duration.

11. A method as set forth in claim 9, wherein the step of measuring includes a step of detecting that a keypad key used to enter the $n^{th}$ character is depressed a plurality of times within a period that is less than a predetermined duration.

12. A method as set forth in claim 9, wherein the step of storing includes preliminary steps of:

reading the specified location in the specified multi-location telephone number memory; and determining if the specified location is empty;

if the specified location is determined to be empty, then storing the first n−m of the entered characters in the specified location; else, if the specified location is determined not to be empty, prompting a user as to whether to store the first n−m of the entered characters in the specified location, and storing the first n−m of the entered characters in the specified location only if an affirmative response is received from the user.

13. A wireless communicator comprising a keypad, a display, a memory, and a controller coupled to said keypad, display and memory, said controller operating under the control of a stored program to enter n consecutive characters from said keypad and for measuring a duration of at least one keypress for designating the entry of the $n^{th}$ character, said controller further operating to store a first n−m of the entered characters into a specified location of at least one multi-location telephone number memory that forms a portion of said memory, wherein at least the location is specified by the $m^{th}$ character or characters, wherein the n characters are entered from the keypad using characters selected from a set of keys consisting of numeric keys 0, 1, 2, 3, 4, 5, 6, 7, 8 and 9.

14. A wireless communicator as set forth in claim 13, wherein there are a plurality of said multi-location telephone number memories, and wherein an identity of one of said plurality of multi-location telephone number memories is also specified by at least one of said $m^{th}$ characters.

15. A wireless communicator as set forth in claim 13, wherein said controller further operates, when measuring the duration of at least one keypress for designating the entry of the $n^{th}$ character, to determine that a keypad key used to enter the $n^{th}$ character is depressed for an amount of time that exceeds a predetermined duration.

16. A wireless communicator as set forth in claim 13, wherein said controller further operates, when measuring the duration of at least one keypress for designating the entry of the $n^{th}$ character, to determine that a keypad key used to enter the $n^{th}$ character is depressed a plurality of times within a period that is less than a predetermined duration.

17. A wireless communicator as set forth in claim 13, wherein said controller further operates, upon designating the entry of $n^{th}$ character, to read the specified location in the multi-location telephone number memory and to determine if the specified location is empty; if the specified location is determined to be empty, said controller operates to store the first n−m of the entered characters in the specified location; else, if the specified location is determined not to be empty, said controller operates said display to prompt a user as to whether to store the first n−m of the entered characters in the specified location, and thereafter stores the first n−m of the entered characters in the specified location only if an affirmative response is received from the user.

18. A wireless communicator as set forth in claim 13, wherein said controller is further operative to detect a predetermined keypad key depression characteristic, during a time when no numeric keypad keys have been previously depressed and buffered, to read a location in the multi-location telephone number memory that is specified by the depressed keypad key, and to display on said display a telephone number that is stored in said location.

* * * * *